(12) United States Patent
Kim et al.

(10) Patent No.: US 12,450,923 B2
(45) Date of Patent: Oct. 21, 2025

(54) SIGN VISIBILITY TEST SYSTEM

(71) Applicant: GWANGJU INSTITUTE OF SCIENCE AND TECHNOLOGY, Gwangju (KR)

(72) Inventors: Seung Jun Kim, Gwangju (KR); Gwang Bin Kim, Gwangju (KR); Eun Sol An, Gwangju (KR); Do Hyeon Yeo, Gwangju (KR); Ji Eun Lee, Gwangju (KR)

(73) Assignee: GWANGJU INSTITUTE OF SCIENCE AND TECHNOLOGY, Gwangju (KR)

( * ) Notice: Subject to any disclaimer, the term of this patent is extended or adjusted under 35 U.S.C. 154(b) by 307 days.

(21) Appl. No.: 18/083,637

(22) Filed: Dec. 19, 2022

(65) Prior Publication Data

US 2023/0215193 A1 Jul. 6, 2023

(30) Foreign Application Priority Data

Dec. 30, 2021 (KR) .......................... 10-2021-0192356

(51) Int. Cl.
*G06V 20/59* (2022.01)
*G06F 3/01* (2006.01)

(52) U.S. Cl.
CPC ............ *G06V 20/597* (2022.01); *G06F 3/013* (2013.01)

(58) Field of Classification Search
CPC .............................. G06V 20/597; G06F 3/013
(Continued)

(56) References Cited

U.S. PATENT DOCUMENTS

| 2022/0354440 A1* | 11/2022 | Grajales | G16H 50/30 |
| 2022/0375350 A1* | 11/2022 | Hawley | G08G 1/149 |
| 2023/0290156 A1* | 9/2023 | Szczerba | H04N 7/183 |

FOREIGN PATENT DOCUMENTS

| KR | 10-1117543 B1 | 3/2012 |
| KR | 10-1247748 B1 | 3/2013 |

(Continued)

OTHER PUBLICATIONS

Office action issued on Dec. 29, 2023 from Korean Patent Office in a counterpart Korean Patent Application No. 10-2021-0192356 (all the cited references are listed in this IDS.) (English translation is also submitted herewith.).

(Continued)

*Primary Examiner* — Gabriel I Garcia
(74) *Attorney, Agent, or Firm* — The PL Law Group, PLLC (57) ABSTRACT

A sign visibility test system includes a virtual reality provision unit for providing a virtual driving environment to a driver, a unit for acquiring bio signal information and gaze information of the driver; and a unit for providing the driver with a questionnaire about an awareness level of a sign, and for receiving answers to the questionnaire from the driver. The virtual reality provision unit provides the driver with the virtual driving environment in which the sign that is a visibility test target is installed, and at a moment when the driver passes the sign in a virtual reality, the questionnaire is provided to the driver within a virtual reality environment, and awareness level information on the sign about which the driver answers the questionnaire is stored as annotation data in the bio signal information and the gaze information.

5 Claims, 8 Drawing Sheets

(58) Field of Classification Search
USPC .......................................................... 382/103
See application file for complete search history.

(56) References Cited

FOREIGN PATENT DOCUMENTS

| | | |
|---|---|---|
| KR | 10-1349640 B1 | 1/2014 |
| KR | 10-1556702 B1 | 10/2015 |
| KR | 10-2171634 B1 | 10/2020 |
| KR | 10-2287384 B1 | 8/2021 |

OTHER PUBLICATIONS

Seung Jun Kim et al., "Development of visibility test methods and tools for public signage", Research Report, Nov. 30, 2020, GIST, https://scienceon.kisti.re.kr/ (English translation of Abstract is submitted herewith.).

* cited by examiner

| Classification | Generate features in connection with virtual reality environment |
|---|---|
| Bio data | number of GSR peaks |
| | cumulative GSR level |
| | average pupil size (left eye) |
| | average pupil size (right eye) |
| | number of eye blinks (left eye) |
| | number of eye blinks (right eye) |
| data of gaze at target sign | time period during which gaze is fixed at target sign |
| | number of times that gaze meets target sign |
| | time period during which gaze is fixed at information (destination text) in target sign |
| | number of times that gaze meets information (destination text) in target sign |
| | location at which gaze first meets target sign |
| | location at which gaze first meets information (destination text) in target sign |
| | time that it takes to move gaze to information in target sign after looking at target sign |
| data of gaze at gaze distraction factors | time period during which gaze is fixed at navigation device |
| | number of times that gaze meets navigation device |
| | time period during which gaze is fixed at rear-view mirror |

SIGN VISIBILITY TEST SYSTEM

CROSS REFERENCE TO RELATED APPLICATION AND CLAIM OF PRIORITY

The application claims the benefit under 35 USC § 119 of Korean Patent Application No. 10-2021-0192356, filed on Dec. 30, 2021, in the Korea Intellectual Property Office, the entire disclosure of which is incorporated herein by reference for all purposes.

BACKGROUND

1. Field of the Invention

The present disclosure relates to a sign visibility test system. More particularly, the present disclosure relates to a sign visibility test system for automatically testing a driver awareness level of a sign on a road on the basis of driver gaze information and bio signal information in a traveling environment composed of a virtual reality provision unit and a motion provision unit.

2. Description of the Related Art

Signs installed on roads provide geographic location and traveling information to drivers and have a significant influence on the drivers' immediate decision making, and thus have a very important role in traveling safety and wayfinding and simultaneously provide drivers and fellow passengers with various types of information including commercial advertisements. Hereinafter, a "sign" is a concept that encompasses a road sign for providing drivers with road and location information as well as an advertisement sign.

Signs installed on roads should be designed to be found by a driver in a traveling situation and understood within a short period of time in a situation in which the driver's gaze is moving continuously. Accordingly, devices for evaluating or improving the visibility of signs have been proposed.

Figure 1:
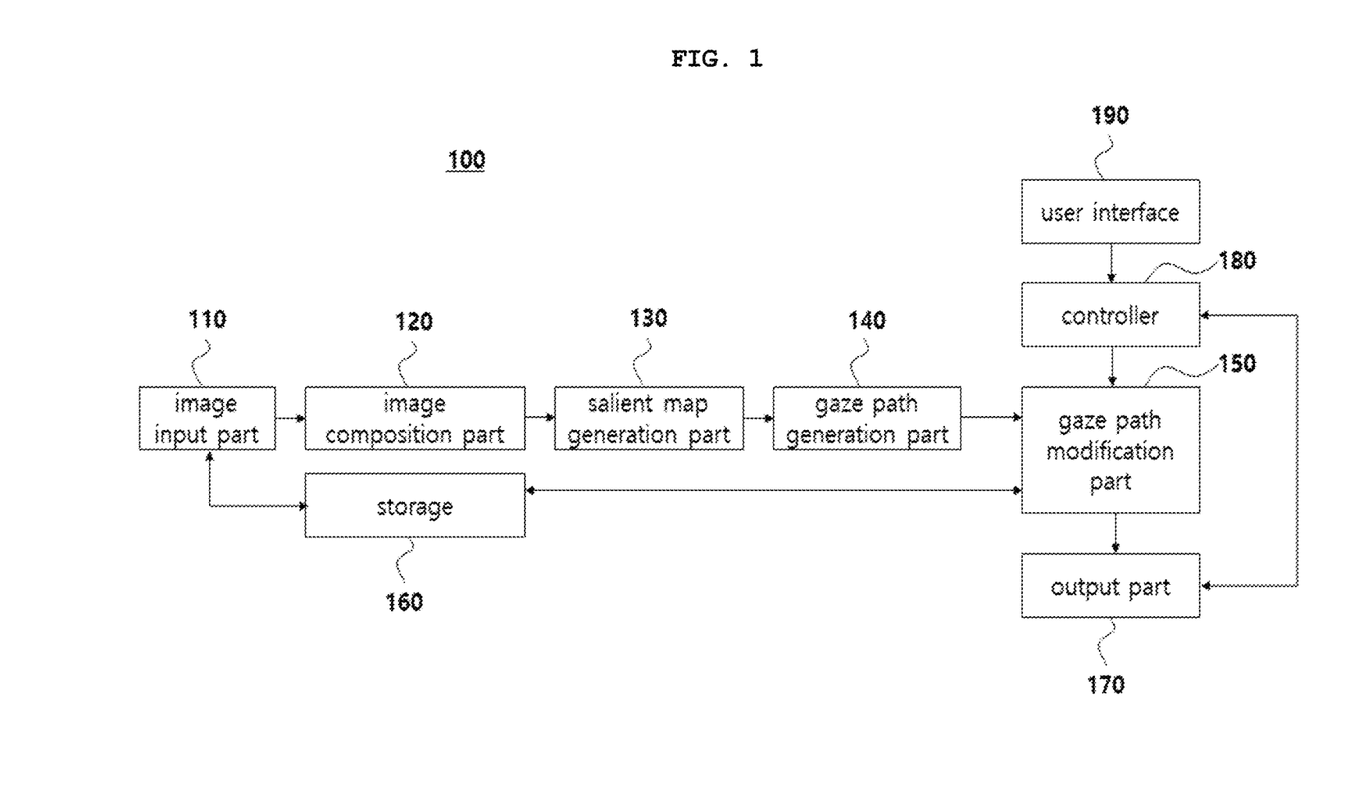
FIG. 1 is a diagram illustrating a sign visibility test system in the related art.

Korean Patent Publication 10-1117543 discloses a technique of learning an image in which a sign is to be installed, using a composite image to generate a salient map, using the salient map to generate a gaze path, and placing the sign based on the gaze path (see FIG. 1). However, a sign is used for the purpose of finding a way, so bottom-up perception based on simple visual prominence and top-down perception occurring with a need to find a particular sign should be comprehensively considered, but this evaluation method cannot achieve appropriate simulation. In addition, a sign is used in the context of traveling and walking. In this case, multiple factors, such as wayfinding, safe traveling, etc., compete for limited working memory, requiring a level of difficulty beyond simply viewing a sign. As a result, it is difficult to evaluate visibility by including the context of traveling and walking appropriately only with the sign test technology disclosed in Korean Patent Publication 10-1117543.

Korean Patent Publication 10-1349640 discloses a method for evaluating awareness performance and preference considering a driver's emotional factors for a road electronic sign as a method of involving user factors in a test instead of an algorithm-based salient map. Specifically, awareness performance and preference are calculated through the time required for reading and the emotional factors, and are used to evaluate the performance of the road electronic sign. Korean Patent Publication 10-1349640 is inventive compared to the related art because a driver's cognitive factor is involved in a test. However, the cognitive factor is used to measure only the time required for reading. In this case, it may be possible to distinguish between better and good among signs with good visibility, but it is unclear to determine which level among finding (awareness) and understanding information has been reached. In addition, it is difficult to evaluate and detect particularly problematic signs, such as signs that are not easily found in traveling situations, signs that are not easy to interpret, etc.

Korean Patent Publication 10-1556702 discloses a method of realizing a traffic sign with improved visibility. This is a method for improving visibility and readability by emitting light to a sign. Compared to a conventional method, there is a limit in wide application because of price, power supply, maintenance, etc. The method may be helpful in improving visibility when it is dark and ambient brightness is significantly reduced at night, but is not helpful for lower visibility due to an installation location or design during the day.

Korean Patent Publication 10-2287384 discloses an advertisement device including an eye-catching unit based on a light-emitting device. In this method, an eye-catching light-emitting device is added to an advertisement device, and it is expected to attract a user's gaze, but quantitative analysis or a tool or device for quantitative analysis is not provided together. In addition, there is a possibility that the eye-catching unit based on a light-emitting device distracts a driver and interfere with safe traveling, so it is difficult to use the eye-catching unit as it is for a sign without validation.

Korean Patent Publication 10-2171634 discloses a device and a method for evaluating attention to an advertisement by using gaze tracking. The method of Korean Patent Publication 10-2171634 may also be suitable for a situation in which an advertisement at a fixed place or an online advertisement is evaluated, but an advertisement evaluation environment does not include the context of a driver and it is difficult to evaluate a sign or an advertisement found in a traveling situation and traveling stability together.

The foregoing is intended merely to aid in the understanding of the background of the present disclosure, and is not intended to mean that the present disclosure falls within the purview of the related art that is already known to those skilled in the art.

SUMMARY

The present disclosure is directed to providing a system capable of automatically testing a situation awareness level of a driver only with various types of sensor data obtained in a virtual reality traveling environment through machine learning based on bio information, gaze information, and situation awareness level questionnaire information obtained from a driver conducting a virtual reality traveling simulation.

According to the present disclosure, there is provided a sign visibility test system including: a virtual reality provision unit for providing a virtual driving environment to a driver; a unit for acquiring bio signal information and gaze information of the driver; and a unit for providing the driver with a questionnaire about an awareness level of a sign, and for receiving answers to the questionnaire from the driver, wherein the virtual reality provision unit provides the driver with the virtual driving environment in which the sign that is a visibility test target is installed, and at a moment when the driver passes the sign in a virtual reality, the questionnaire is provided to the driver within a virtual reality environment, and awareness level information on the sign about which the driver answers the questionnaire is stored as annotation data in the bio signal information and the gaze information.

In addition, machine learning may be performed using the bio signal information and the gaze information as input values and using the awareness level information as output information to automatically test the awareness level only with the bio signal information and the gaze information of the driver.

Furthermore, the awareness level information may be classified into a level at which the driver is unaware of the sign, a level at which the driver is aware of the sign, but does not understand what the sign says, or a level at which the driver is aware of the sign and understands what the sign says.

Last, the bio signal information may be at least one selected from a group of the number of GSR peaks, a cumulative GSR level, an average pupil size, and the number of eye blinks, and the gaze information may be at least one selected from a group of a time period during which a gaze is fixed at a target sign, the number of times that the gaze meets the target sign, a time period during which the gaze is fixed at information in the target sign, the number of times that the gaze meets the information in the target sign, a location at which the gaze first meets the target sign, a location at which the gaze first meets the information in the target sign, the time that it takes to move the gaze to the information in the target sign after looking at the target sign, a time period during which the gaze is fixed at a navigation device, the number of times that the gaze meets the navigation device, a time period during which the gaze is fixed at a rear-view mirror, the number of times that the gaze meets the rear-view mirror, a time period during which the gaze is fixed at other road signs, the number of times that the gaze meets the road signs, a time period during which the gaze is fixed at traffic signs, the number of times that the gaze meets the traffic signs, a time period during which the gaze is fixed at pedestrians, the number of times that the gaze meets the pedestrians, a time period during which the gaze is fixed at signal systems, the number of times that the gaze meets the signal systems, a time period during which the gaze is fixed at roads, the number of times that the gaze meets the roads, a time period during which the gaze is fixed at other buildings and roadside trees, and the number of times that the gaze meets the buildings and roadside trees.

The sign visibility test system according to the present disclosure performs machine learning based on bio information, gaze information, and situation awareness level questionnaire information obtained from a driver conducting a virtual reality traveling simulation, and after machine learning, a situation awareness level of the driver is automatically and quantitatively tested only with various types of sensor data obtained in a virtual reality traveling environment without requesting the driver to answer additional questionnaires, so that experiments can be conducted with change in various environment factors, such as a sign location, a design, etc. suitable for each installation place.

BRIEF DESCRIPTION OF THE DRAWINGS

The above and other objectives, features, and other advantages of the present disclosure will be more clearly understood from the following detailed description when taken in conjunction with the accompanying drawings, in which.

DETAILED DESCRIPTION

Hereinafter, the overall configuration of a sign visibility test system according to the present disclosure will be described with reference to the accompanying drawings. Specific structural and functional descriptions of embodiments of the present disclosure are only for illustrative purposes of the embodiments according to the present disclosure, and the embodiments according to the present disclosure may be implemented in various forms. Further, the present disclosure should not be construed as being limited to the following embodiments, but should be construed as including all changes, equivalents, and replacements included in the spirit and the scope of the present disclosure.

Figure 2:
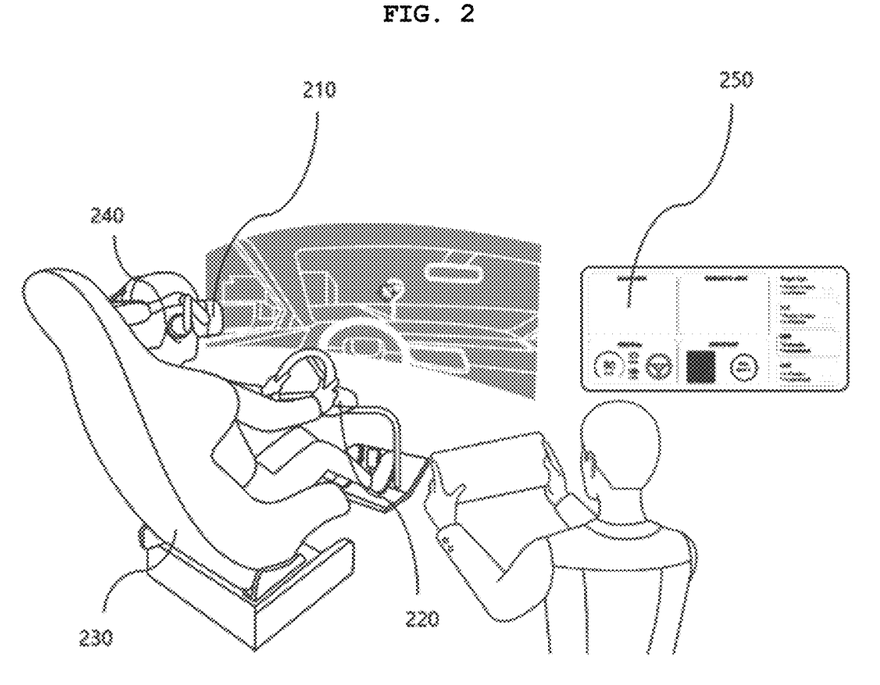
FIG. 2 is a diagram illustrating a hardware configuration of a sign visibility test system according to the present disclosure.

A hardware configuration of a sign visibility test system according to the present disclosure will be described with reference to FIG. 2. A virtual reality provision unit 210 is a device for providing a driver participating in a sign visibility test with a virtual video as if the driver were actually driving. In general, a virtual driving environment is provided to a driver through a head-mounted display (HMD). Preferably, a gaze tracking unit for tracking a driver's gaze is embedded in the HMD. A driver manipulates a traveling simulator 220 for simulating a driver seat of a vehicle and thus has an experience in a virtual reality as if the driver were actually driving. More preferably, provided is a motion provision unit 230 for simulating inertia and impact that a driver can feel when actually driving, and providing the same to the driver.

A virtual reality traveling experience device including the virtual reality provision unit 210, the traveling simulator 220, and the motion provision unit 230 corresponds to a general related art, so a detailed description thereof will be omitted.

Furthermore, a bio signal sensor 240 for obtaining bio information of a driver may be further included. Specific types of bio signals that may be used for a sign visibility test will be described later.

Figure 3:
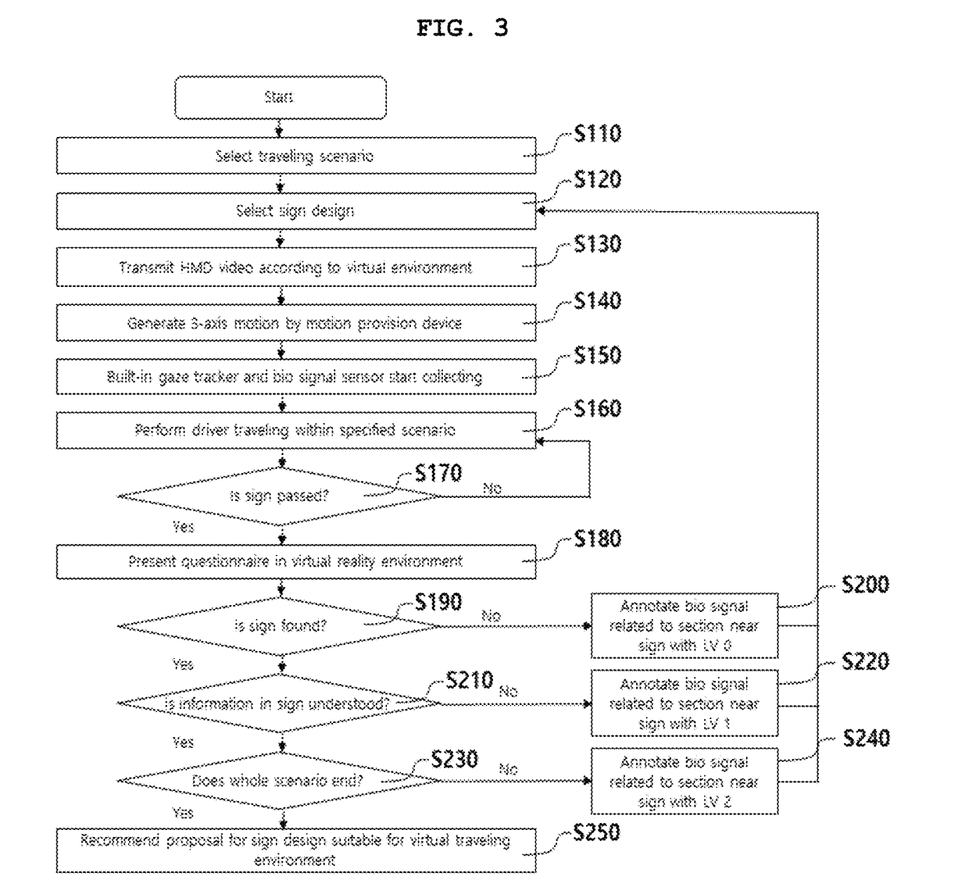
FIG. 3 is a flowchart illustrating an operating process of the sign visibility test system according to the present disclosure.

FIG. 3 is a flowchart illustrating the operation of the sign visibility test system. The flowchart itself may be regarded as a process of having a sign visibility test as well as a process of generating machine learning data to automatically have a sign visibility test.

First, a traveling scenario is selected in step S110. Geographic information stored in a database is used to select a road on which a sign is to be installed at a location, and a sign design to be tested is selected in step S120. On the basis of virtual environment information determined in steps S110 and S120, a video is transmitted to a driver through the HMD in step S130. Simultaneously, a motion provision device provides 3-axis motion corresponding to the video to the driver in step S140.

In the above step, the gaze tracking unit embedded in the HMD tracks the driver's gaze continuously for datafication, and simultaneously, body information of the driver obtained through the bio signal sensor 240 is also subjected to datafication in step S150.

Figure 6:
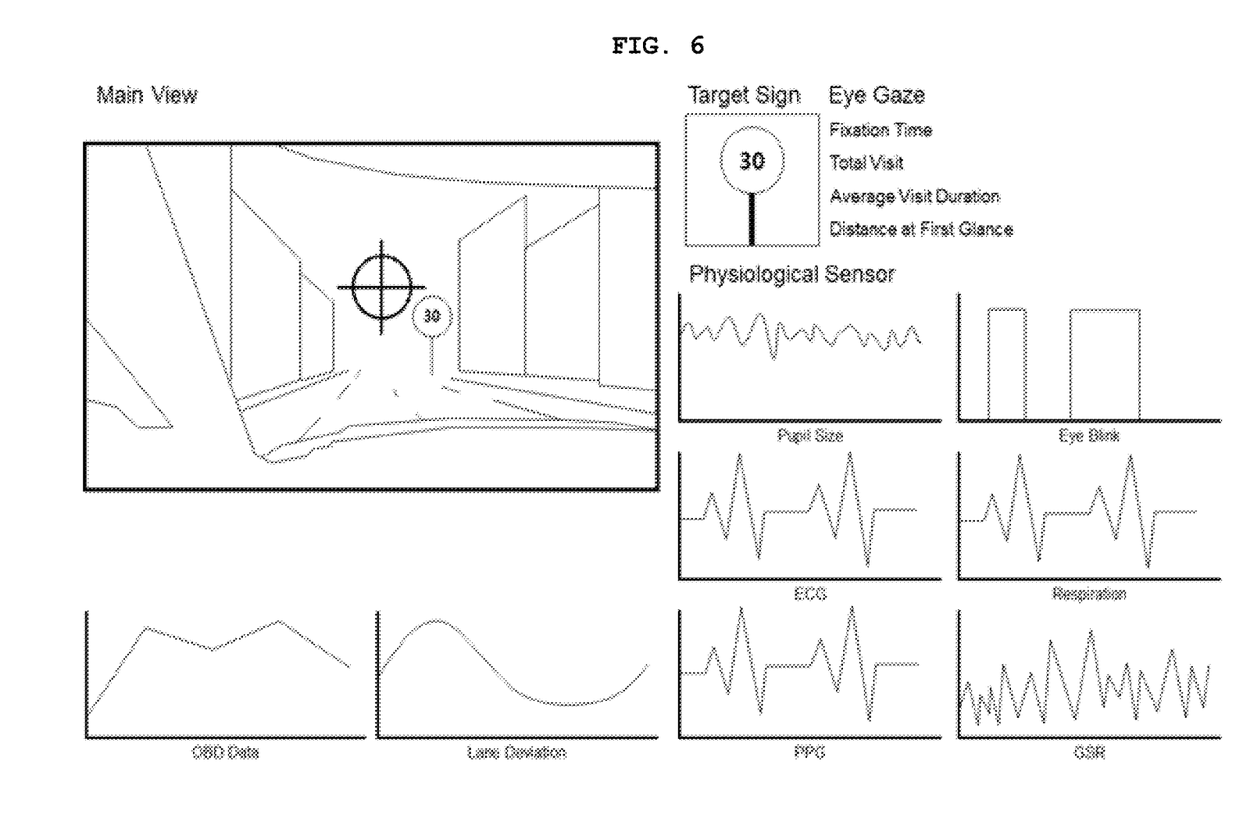
FIG. 6 is a diagram illustrating a panel screen on which sensor data is visualized.
Figure 7:
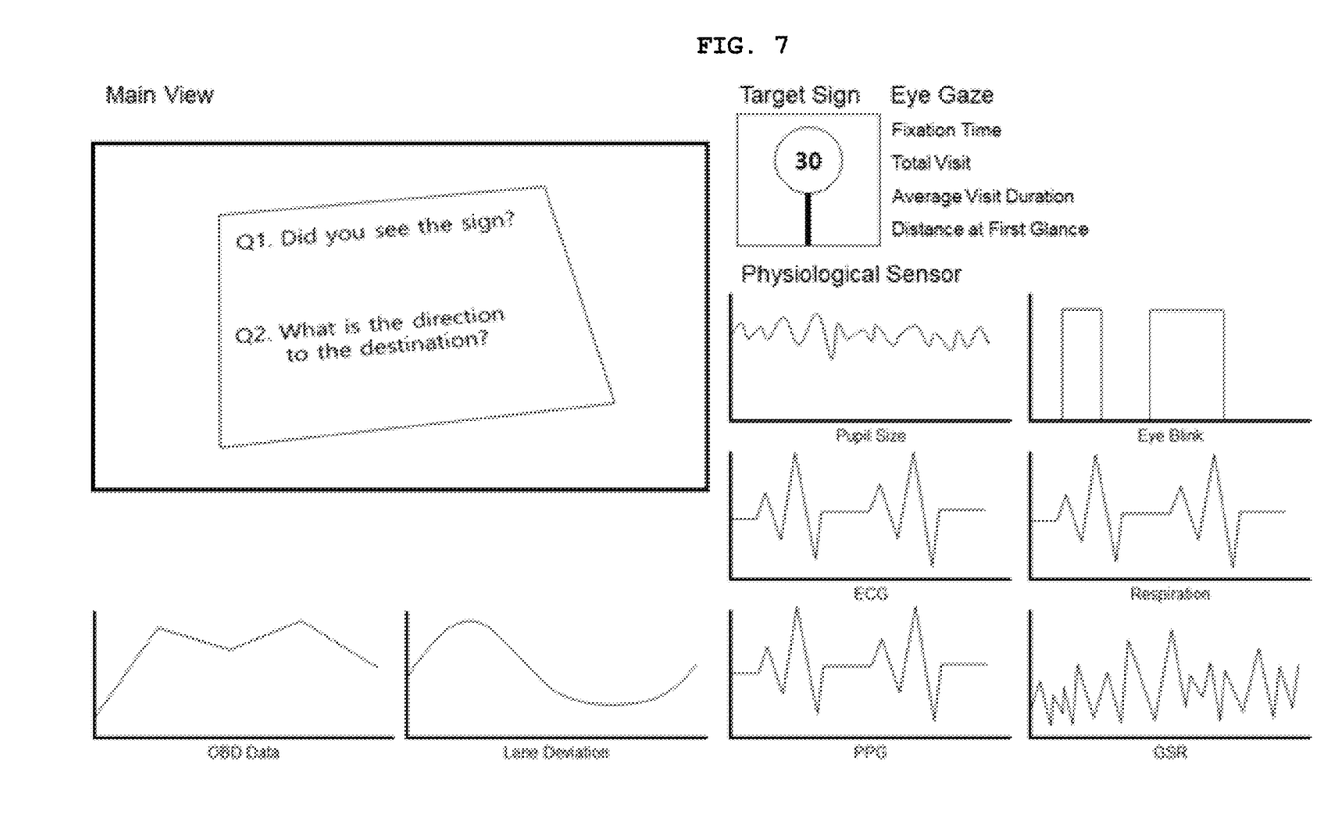
FIG. 7 is a diagram illustrating a questionnaire provided to a driver through a virtual reality environment.

The set scenario is continuously enacted before the sign is passed in the virtual reality S160. At the moment when the sign is passed in the virtual reality in step S170, a questionnaire is presented in the virtual reality environment in step S180. FIG. 6 is a diagram illustrating a screen for visualizing sensor data obtained from the bio signal sensor 240. FIG. 7 is a diagram illustrating an example of the questionnaire provided to a driver in a virtual environment in step S180. Adopting Endsley's model for situation awareness, the questionnaire classifies a driver awareness level of a sign or an advertisement into three levels (level 0: a driver is unaware of the sign, level 1: a driver is aware of the sign, but does not understand, and level 2: a driver is aware of the sign and understands what the sign says). In order to secure annotation data for training a classification model, the present disclosure includes a tool for collecting sensor data as well as questionnaire data in a traveling environment. After a target sign or advertisement is passed, a question for each level is presented to the driver in the virtual reality simulation. Depending on an answer to the question, gaze and bio signal data are automatically annotated with a situation awareness level.

For example, with respect to a VR internal questionnaire conducted immediately after passing a sign, when a tester responds that he or she has not found the target sign in step S190, bio sensor data of a timestamp collected in a section corresponding to the sign is automatically annotated with visibility level 0 (the tester is unaware of the sign) and stored in step S200. When the tester has found the sign, but does not understand key information on a destination location in the sign in step S210, bio sensor data of a timestamp collected in the section corresponding to the sign is automatically annotated with visibility level 1 (the tester is aware of the sign, but does not understand) and stored in step S220. When the tester has found the sign and understands the key information on the destination location in the sign in step S230, bio sensor data of a timestamp collected in the section corresponding to the sign is automatically annotated with visibility level 2 (the tester is aware of the sign and understands what the sign says) and stored in step S240. In addition to this, additional awareness levels of surroundings (whether there is a traffic signal at a crosswalk, the number of pedestrians crossing a crosswalk, etc.) may be used as supplementary data.

After going through the above steps, situation awareness information of the driver with respect to the sign in the scenario is secured. Furthermore, the above steps are repeated for other various sign proposals, so that situation awareness information of a driver may be secured with respect to the various sign proposals in the environment, and on the basis of the situation awareness information, a proposal for a sign design suitable for the virtual traveling environment is recommended in step S250.

Figure 5:
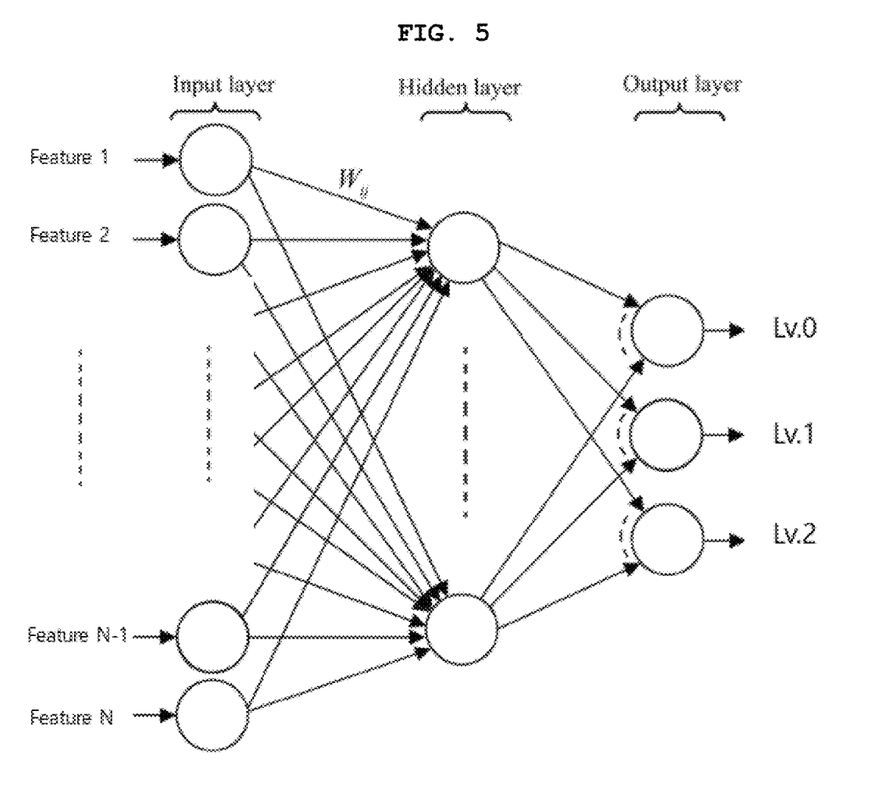
FIG. 5 is a diagram illustrating a concept of learning a relation between bio signal information, gaze information, and visibility test information through machine learning.

The above steps may be used as a sign visibility test tool by themselves. However, bio signal information and gaze information obtained through the above steps and test information annotated corresponding to the bio signal information and the gaze information are used to perform machine learning, so that sign visibility is tested only with gaze information and bio signal information of a driver without additional questionnaire information later. As show in FIG. 5, bio signal information and gaze information obtained through various sensors are input to an input layer, and simultaneously, visibility level information (level 0, level 1, and level 2) obtained through the process shown in FIG. 3 is used as output, thereby performing machine learning. Specifically, machine learning consists of a random forest, an extra tree, a GBR tree, a logistic regression model, a support vector machine, a multilayer perceptron, and an ensemble model thereof, and is implemented such that when a driver's traveling starts after receiving gaze and sensor data as input, gaze and bio signal data is input to a machine learning model to output a sign awareness level.

Figure 4:
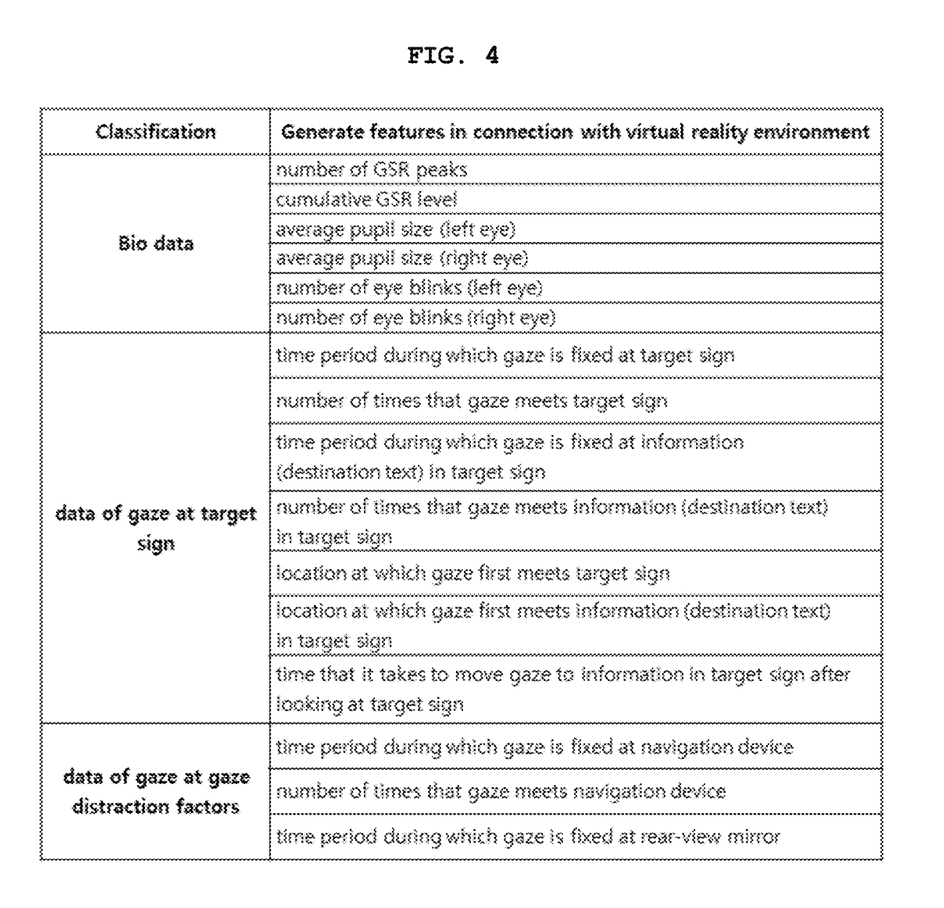
FIG. 4 is a diagram illustrating an example of bio signal information and gaze information that may be used in the sign visibility test system according to the present disclosure.

More specifically, raw data of the sensor and the gaze and features automatically generated in connection with the context of virtual reality are used collectively for learning and the test. FIG. 4 shows features that may be used for machine learning, which include bio sensor data, data of a gaze at a target sign, and data of a gaze at gaze distraction factors. The bio sensor data includes 1) the number of GSR peaks, 2) a cumulative GSR level, 3) an average pupil size (left eye), 4) an average pupil size (right eye), 5) the number of eye blinks (left eye), 6) the number of eye blinks (right eye), etc. The data of a gaze at the target sign includes 7) a time period during which a gaze is fixed at the target sign, 8) the number of times that a gaze meets the target sign, 9) a time period during which a gaze is fixed at information (destination text) in the target sign, 10) the number of times that a gaze meets the information (destination text) in the target sign, 11) a location at which a gaze first meets the target sign, 12) a location at which a gaze first meets the information (destination text) in the target sign, 13) the time that it takes to move a gaze to the information in the target sign after looking at the target sign, etc. The data of a gaze at gaze distraction factors includes 14) a time period during which a gaze is fixed at a navigation device, 15) the number of times that a gaze meets the navigation device, 16) a time period during which a gaze is fixed at a rear-view mirror, 17) the number of times that a gaze meets the rear-view mirror, 18) a time period during which a gaze is fixed at other road signs, 19) the number of times that a gaze meets the road signs, 20) a time period during which a gaze is fixed at traffic signs, 21) the number of times that a gaze meets the traffic signs, 22) a time period during which a gaze is fixed at pedestrians, 23) the number of time that a gaze meets the pedestrians, 24) a time period during which a gaze is fixed at signal systems, 25) the number of times that a gaze meets the signal systems, 26) a time period during which a gaze is fixed at roads, 27) the number of time that a gaze meets the roads, 28) a time period during which a gaze is fixed at other buildings and roadside trees, 29) the number of time that a gaze meets the buildings and roadside trees, etc.

Through the above machine learning, the sign visibility test system according to the present disclosure has been trained for a relation between visibility test levels and bio data and gaze data. Therefore, when sufficient learning has been performed, a sign visibility test is conducted only with bio signal and gaze data without requesting the driver to answer additional questionnaires, thereby increasing accuracy and efficiency of the test.

Figure 8:
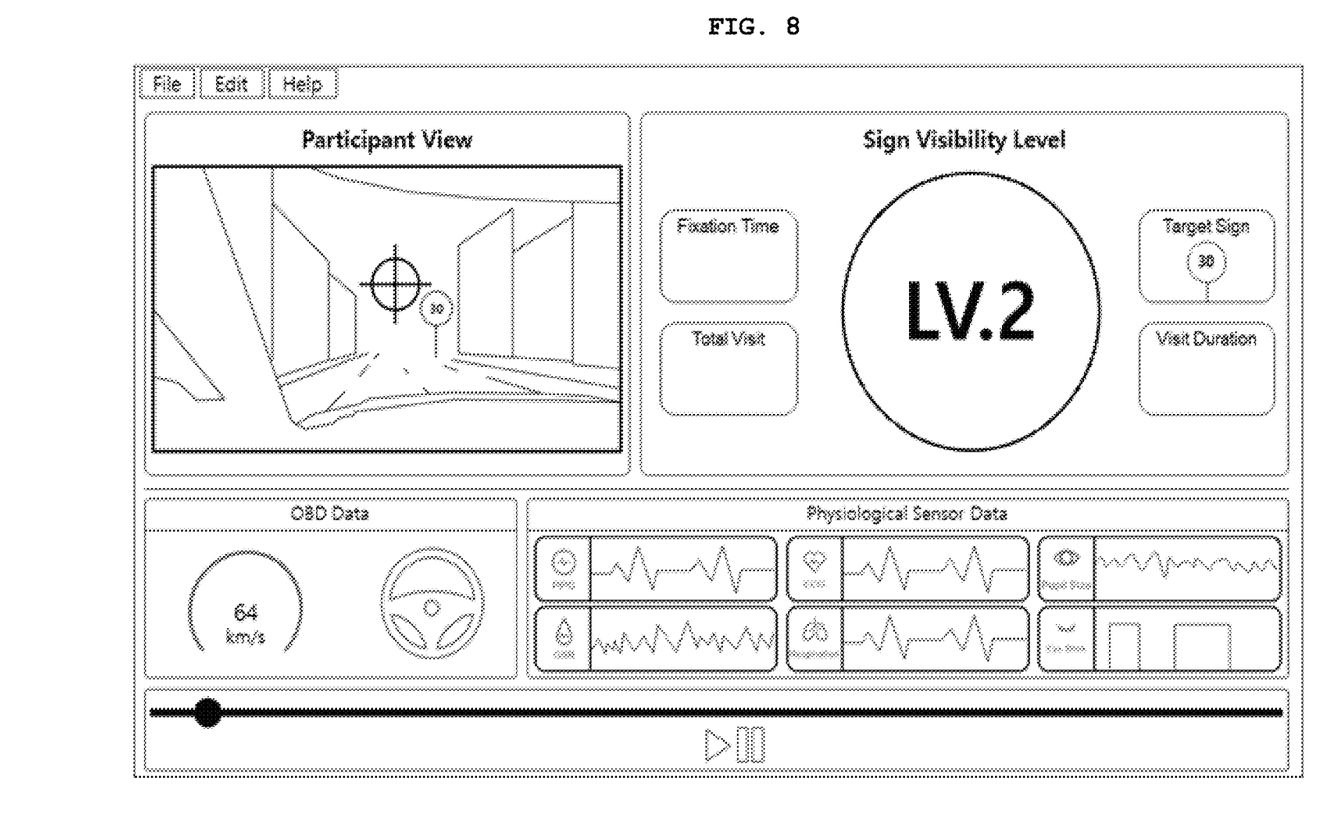
FIG. 8 is a diagram illustrating a screen on which sensor data is visualized and a driver awareness level is provided as a result.

FIG. 8 is a diagram illustrating an implementation example of a sensor data visualization panel 250 (shown in FIG. 2) for visualization of a driver awareness level test system and a machine learning-based sign awareness algorithm test panel. The sensor data visualization panel is implemented such that in addition to bio signal, a virtual reality traveling environment, a visibility level of a sign passed just before in the traveling environment, and vehicle traveling information (speed, acceleration, etc.) are read and the tester is capable of interpreting the bio signal and the sign visibility (driver awareness level) in connection with the surrounding environment and the context of traveling. In addition, a sign to be tested is visually presented on the current traveling path, and the number of times that a gaze meets each target object, such as a target sign, an AOI sign (an individual sign where desired information is located within the target sign), a traffic sign, other signs, a road, etc., and a time period thereof are visualized. Afterward, the driver awareness level is presented in three levels (level 0: a driver is unaware of the sign, level 1: a driver is aware of the sign, but does not understand, and level 2: a driver is aware of the sign and understands what the sign says). The entire traveling path is visualized and a driver awareness level log for signs tested on the path is also provided.

Although a preferred embodiment of the present disclosure has been described for illustrative purposes, those skilled in the art will appreciate that various modifications, additions and substitutions are possible, without departing from the scope and spirit of the disclosure as disclosed in the accompanying claims.

What is claimed is:

1. A sign visibility test system comprising:
   a head-mounted display configured for providing a driver with a virtual driving environment by providing a virtual video including a road in which a sign that is a visibility test target is installed and a questionnaire about an awareness level of the sign at a moment when the driver passes the sign in the virtual driving environment and for receiving answers to the questionnaire from the driver;
   a traveling simulator configured to be manipulated by the driver and to simulate a driver seat of a vehicle in the virtual driving environment;
   a motion provision unit configured to generate 3-axis motion corresponding to the virtual video in order to simulate inertia and impact that the driver can feel;
   a bio signal sensor configured for acquiring bio signal information and gaze information of the driver; and
   a sensor data visualization panel configured for displaying the virtual driving environment, the bio signal information and the gaze information,
   wherein awareness level information on the sign about which the driver answers the questionnaire is stored as annotation data in the bio signal information and the gaze information,
   the bio signal information and the gaze information are temporally synchronized with the moment when the driver recognizes the sign,
   the driver's awareness level of the sign is quantified in real time and classified into three defined levels including a first level when the driver does not perceive the sign, a second level when the driver does perceive but does not understand the sign, and a third level when the driver perceives and understands the sign, thereby enabling real-time visibility assessment of the sign based on the driver's classified awareness level.

2. The system of claim 1, wherein machine learning is performed using the bio signal information and the gaze information as input values and using the awareness level information as output information to automatically test the awareness level only with the bio signal information and the gaze information of the driver.

3. The system of claim 1, wherein the awareness level information is classified into a level at which the driver is unaware of the sign, a level at which the driver is aware of the sign, but does not understand what the sign says, or a level at which the driver is aware of the sign and understands what the sign says.

4. The system of claim 1, wherein the bio signal information is at least one selected from a group of the number of GSR peaks, a cumulative GSR level, an average pupil size, and the number of eye blinks; and
   the gaze information is at least one selected from a group of a time period during which a gaze is fixed at a target sign, the number of times that the gaze meets the target sign, a time period during which the gaze is fixed at information in the target sign, the number of times that the gaze meets the information in the target sign, a location at which the gaze first meets the target sign, a location at which the gaze first meets the information in the target sign, the time that it takes to move the gaze to the information in the target sign after looking at the target sign, a time period during which the gaze is fixed at a navigation device, the number of times that the gaze meets the navigation device, a time period during which the gaze is fixed at a rear-view mirror, the number of times that the gaze meets the rear-view mirror, a time period during which the gaze is fixed at other road signs, the number of times that the gaze meets the road signs, a time period during which the gaze is fixed at traffic signs, the number of times that the gaze meets the traffic signs, a time period during which the gaze is fixed at pedestrians, the number of times that the gaze meets the pedestrians, a time period during which the gaze is fixed at signal systems, the number of times that the gaze meets the signal systems, a time period during which the gaze is fixed at roads, the number of times that the gaze meets the roads, a time period during which the gaze is fixed at other buildings and roadside trees, and the number of times that the gaze meets the buildings and roadside trees.

5. A method for installing a sign, the method comprising:
   selecting a virtual driving environment by selecting a traveling scenario including a road on which a sign is to be installed at a location and selecting a design of the sign;
   transmitting a video to a driver in order to provide a virtual driving environment;
   generating 3-axis motion corresponding to the video to the drive;
   tracking, by a gaze tracking unit, a driver's gaze continuously for datafication of gaze information, and simultaneously, sensing, by a bio signal, body information of the driver for datafication of bio signal information;
   providing the driver with a questionnaire about an awareness level of the sign at a moment when the driver passes the sign;
   obtaining an answer to the questionnaire from the driver;
   storing awareness level information on the sign about which the driver answers the questionnaire as annotation data in the bio signal information and the gaze information;
   selecting a location and a design of a sign according to the bio signal information and the gaze information; and installing the sign of the selected design on the selected location.

* * * * *